United States Patent
Müller et al.

(10) Patent No.: US 6,315,326 B1
(45) Date of Patent: *Nov. 13, 2001

(54) ROLLBAR

(75) Inventors: Hartwig Müller, Chemnitz; Robert Schweier, Neukirchen, both of (DE)

(73) Assignees: Blechformwerke Bernsbach GmbH, Bernsbach; ISE Innomotive Systems Europe GmbH, Bérgneustadt, both of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,442

(22) Filed: Jul. 19, 1999

(30) Foreign Application Priority Data

Jul. 23, 1998 (DE) ................................ 298 13 152

(51) Int. Cl.⁷ ................................................. B60R 21/13
(52) U.S. Cl. .............................................................. 280/756
(58) Field of Search .................... 280/756; 296/10, 296/190.03

(56) References Cited

U.S. PATENT DOCUMENTS

| | | | |
|---|---|---|---|
| 4,135,756 | * | 1/1979 | Hausmann . |
| 4,202,565 | | 5/1980 | Mosch .......................... 280/756 |
| 4,557,502 | * | 12/1985 | Scaduto et al. ................ 280/756 |
| 4,729,570 | * | 3/1988 | Welsh, Jr. . |
| 4,767,147 | * | 8/1988 | Kobayakawa et al . |
| 4,978,161 | | 12/1990 | Schulze ........................... 296/180 |
| 5,104,177 | * | 4/1992 | Thomas, Jr. . |
| 6,179,327 | * | 1/2001 | Muller et al. ................... 280/756 |

FOREIGN PATENT DOCUMENTS

| | | |
|---|---|---|
| 18 08 786 | 6/1970 | (DE) . |
| 20 62 446 | 7/1972 | (DE) . |
| 2409076 | 8/1975 | (DE) . |
| 29809416 | * 2/1999 | (DE) . |
| 0 233 777 | 8/1987 | (EP) . |
| 454279 | 10/1991 | (EP) . |
| 0 676 316 | 10/1995 | (EP) . |
| 952042 | * 10/1999 | (EP) . |
| 603466 | * 4/1926 | (FR) . |
| 2 076 402 | 10/1971 | (FR) . |
| 1 213 476 | 11/1970 | (GB) . |
| 2 047 180 | 11/1980 | (GB) . |
| WO 97 48506 | 12/1997 | (WO) . |

OTHER PUBLICATIONS

Popular Mechanics Web Site www.popularmechanic.com brochure titled "Tu, the Small Wonder" illustrating a convertible with a corbon–fiber rollbar, Dec. 1994.*

Nautica Magazine Web Site www.nauticait brochures titled "Boatshow" illustrating a boat with a fiberglass rollbar (2–brochures) Dec. 1994.*

Paper Presented by US Army to SAMPE Technical Conference of 11/90 —titled Light Weight Composite Rollbar for Army Towed Howitzwer.*

* cited by examiner

Primary Examiner—Brian J. Johnson
Assistant Examiner—Bryan Fischmann
(74) Attorney, Agent, or Firm—Armstrong, Westerman, Hattori, McLeland & Naughton, LLP

(57) ABSTRACT

A rollbar for an open sports car which extends over the width of the vehicle, having a basic shell body which follows the rollbar shape and consists of molded two-dimensional material with longitudinal ribbings which are alternately raised toward the exterior and interior side of the rollbar. The rollbar shell is integrally formed from a pressed molding of fibrous composite plastic or metallic material and can include stiffening inserts which extend over at least part of the longitudinal extrusion of the shell. An anti-abrasion material can be integrally connected or embedded into the surface of the shell. The rollbar is light weight, optimally designed for individual types of loads and can be integrated into the car body in an esthetically appearing manner.

31 Claims, 4 Drawing Sheets

ROLLBAR

BACKGROUND OF THE INVENTION

1. Field of the Invention

The present invention relates to a rollbar for an automotive vehicle, in particular for an open sports car.

2. Description of Related Art

A rollbar in an automotive vehicle serves to protect the passengers, but in an open sports car also constitutes a design feature which influences the esthetic overall impression. Conventional rollbars that extend over the entire vehicle width are steel or light-metal tube constructions or steel-case welding constructions which have a considerable additional weight and constitute a mass located at an undesiredly high level. Furthermore, such rollbars of the prior art are by far overqualified for individual loads, most of the time because of manufacturing reasons (use of constant cross-sections).

It is the object of this invention to provide a vehicle-bridging rollbar of the above-mentioned type which is lightweight and optimally designed for individual types of loads.

BRIEF SUMMARY OF THE INVENTION

Longitudinal ribbings of a basic shell body which are alternately raised towards the interior and exterior, respectively, and extend in approximately straight fashion over the longitudinal extension ensure the necessary stiffness for all types of loads in a flat cross-section of the rollbar which is located in a direction transverse to a main rollbar plane. The monocoque or shell-type construction with the longitudinal, stiffness-ensuring ribbings reduces the weight considerably in comparison with conventional rollbars and permits an integration of the rollbar into the car body in an advantageous manner as regards esthetical appearance and design.

Embodiments of the subject matter of the invention will now be explained with reference to the drawings, in which:

DETAILED DESCRIPTION OF THE INVENTION

Figure 1:
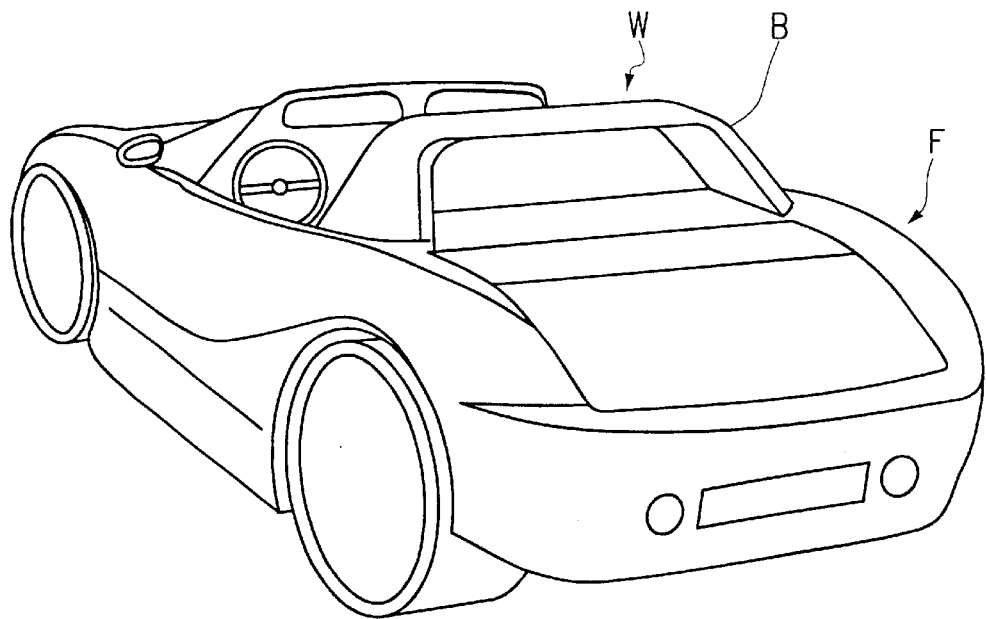
FIG.1 is a perspective view of an open sports car comprising a rollbar of the invention.

FIG. 1 shows an automotive vehicle F, in particular an open sports car, equipped with an inverted U-shaped rollbar B which behind the seats approximately bridges the width of the vehicle and which is e.g. provided with a lining over its entire surface and assumes the function of a spoiler as spoiler W.

Figure 2:
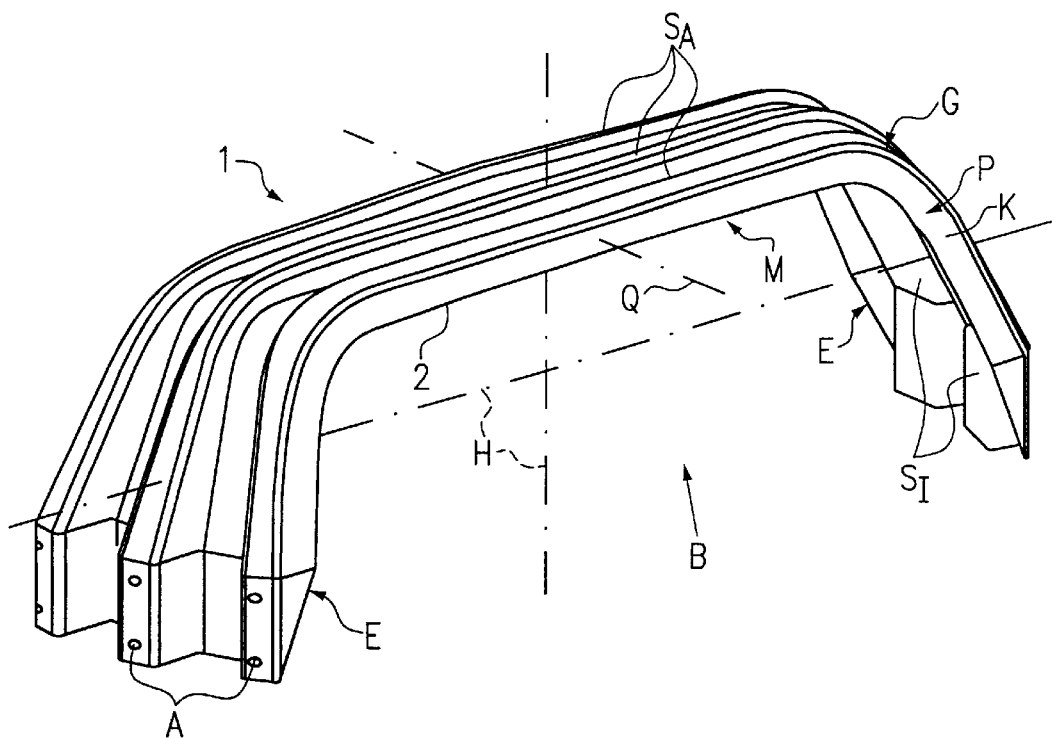
FIG. 2 is a perspective view of the rollbar of the Ed invention.

The rollbar B in FIG. 2 is of a monocoque or shell-type construction and e.g. made from fibrous composite plastics K, expediently as one piece. Fibrous composite material of plastics K is particularly suited as the material having fabric layers embedded in a plastic matrix in the form of prepregs and comprising weft and warp yarns (glass fibers, carbon fibers, aramide fibers or mixed fabrics consisting of said fibers). The rollbar B is expediently a pressed molding P which has an approximately straight center section M and end sections E bent downwards from said center section. However, metallic materials, such as steel or light-metal sheets, are also suited as materials for the rollbar. With its center section M and its end sections E the rollbar B defines a main rollbar plane H (illustrated by dash-dotted intersecting axes) which in the vehicle is oriented in a direction transverse to the longitudinal direction of the vehicle. The rollbar B has a flat cross-section with a cross-sectional main axis Q which is oriented in a direction approximately perpendicular to the main rollbar plane H. For adaptation to the contour of the car body the cross-sectional main axis Q in the end sections E may be inclined relative to the main rollbar plane H, as compared with the center section M.

In FIG. 2 the rollbar B consists of a basic monocoque or shell body G, preferably of an integral shell construction, which comprises longitudinally extending longitudinal ribbings $S_A$ and $S_I$ molded approximately in parallel with the main rollbar plane H. The ribbings extend over the whole length of the rollbar B. Fastening connections A are preformed in the end sections E for fixing the rollbar B in the vehicle F. The rollbar B may fixedly be installed in the vehicle or may extensibly be mounted on extension means (not shown). The size of at least one of the longitudinal ribbings may gradually increase towards the ends of the rollbar. The bar has molded thereinto a plurality of longitudinal ribbings $S_A$ which are raised relative to the exterior side 1 of the bar, and at least one longitudinal ribbing $S_I$ which is raised towards the interior side 2 of the bar. The longitudinal ribbings may have a rounded or four-edged cross-section, expediently formed with broken edges. For manufacturing reasons the wall thickness of the basic shell body G is substantially constant, but could also be adapted to the curve of the moments.

FIGS. 3 to 11 illustrate cross-sectional shapes of the rollbar B by way of sections taken in planes that are vertical in orientation and perpendicular to the main rollbar plane H.

Figure 3:
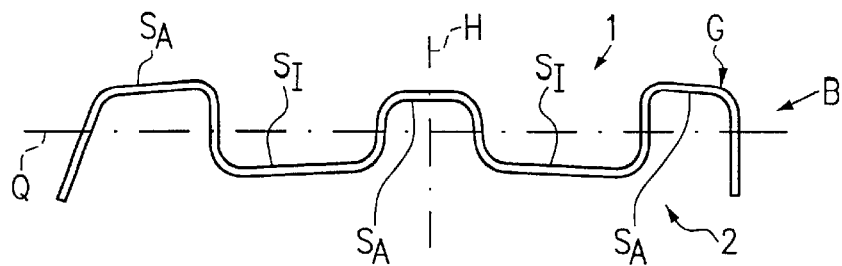
FIGS. 3–11 are cross-sectional views of different embodiments of rollbars of the invention.

The rollbar B in FIG. 3 is successively provided in its cross-section and in the direction of the cross-sectional main axis Q in each edge portion with a longitudinal ribbing $S_A$ which is raised towards the exterior side 1 of the bar and with a central longitudinal ribbing $S_A$ which is raised towards the exterior side 1 of the bar and also with two longitudinal ribbings $S_I$ which are provided between the longitudinal ribbings $S_A$ raised towards the exterior side 1 of the bar and which are raised towards the interior side 2 of the bar. The widths of the longitudinal ribbings $S_I$, $S_A$ are chosen such that the moment of resistance of the entire cross-section reaches a maximum level. This results in a meander-like cross-sectional extension, with the exterior legs of the outer longitudinal ribbings $S_A$ terminating on edges facing the interior side 2. The shell body G with the above-described cross-sectional configuration is expediently designed as a pressed molding of fibrous composite plastics. The two outer longitudinal ribbings $S_A$ project from the cross-sectional main axis Q to a higher level relative to the exterior side 1 of the bar than the intermediate longitudinal ribbing $S_A$.

Figure 4:
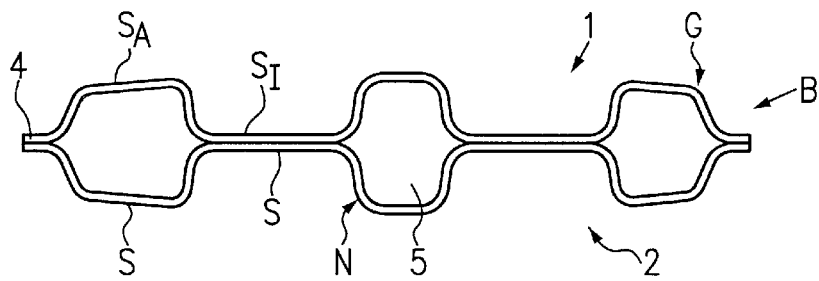

In the rollbar B of FIG. 4, the basic shell body G, e.g. according to FIG.3, is combined with a further shell body N having a cross-section which is approximately mirror-inverted about the cross-sectional main axis so that longitudinally extending hollow channels 5 are defined in the rollbar B. In other words, the shell body N is formed with longitudinal ribbings S which are mirror-inverted relative to the longitudinal ribbings of the basic shell body G. Connection flanges 4 can be used for connecting (gluing or welding)

the structure, just like the further mutual contact portions of the two-shell type configuration of the rollbar B.

Figure 5:
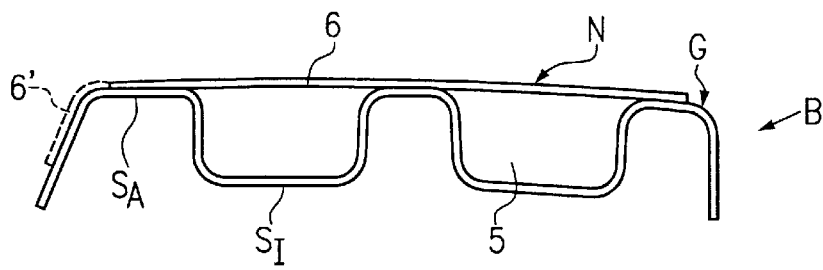

The rollbar B in FIG. 5 is of a two-shell construction, and the basic shell body G, approximately corresponding to the configuration of FIG. 3, but provided with a slightly higher central longitudinal ribbing, has mounted thereon on the upper side a shell body N which is designed as a two-dimensional substrate 6 and consists of the same material as or a different material (e.g. metal sheet) than the basic shell body G which is expediently designed as a pressed molding of fibrous composite plastics. The lateral edges of the shell body N can be extended outwards and inwards to a further degree than has been shown (outlined at 6 in broken line) to form an anti-abrasion means.

Figure 6:
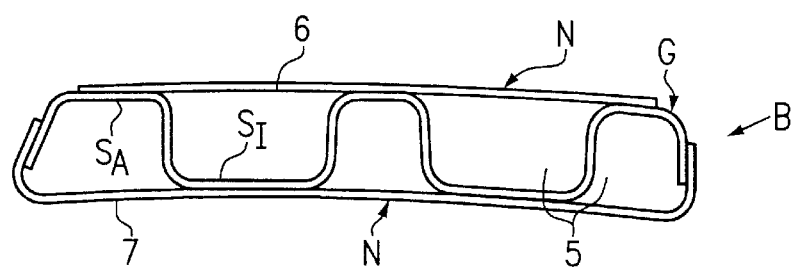

In FIG. 6 the basic shell body G of the rollbar B is combined with an outer shell body N according to FIG. 5 and an inner shell body N which as an approximately U-shaped substrate 7 covers the bottom side of the basic shell body G that faces the interior side of the bar and covers the outer edge portions of the basic shell body G laterally on the outside (or the inside, not shown). The shell bodies N may be made from the same material as the basic shell body G, e.g. from fibrous composite plastics, or from a different material, such as metal or sheet.

Figure 7:
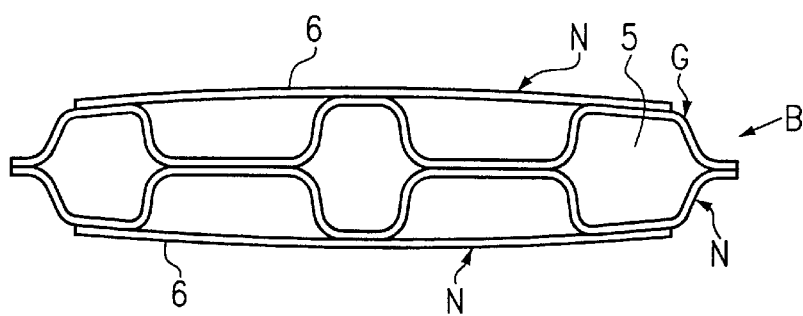

In FIG. 7 the basic shell body G of the rollbar B is combined, as in FIG, 4, with a shell body N shaped in mirror-inverted fashion, and outer and inner shell bodies N are additionally mounted in the form of substantially flat substrates 6. A plurality of hollow channels 5 extending in the longitudinal direction of the rollbar B are thereby created. The individual components of the rollbar B may consist of the same or different materials. For instance, the outer shell body N could be made of metal to achieve an improved abrasion protection for the rollbar B.

Figure 8:
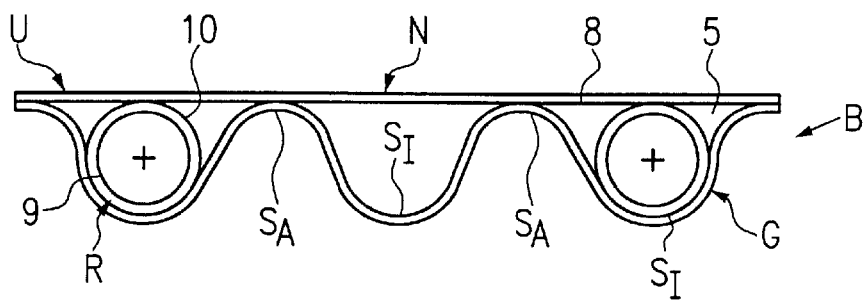

In FIG. 8 the basic shell body G has a cross-section having a serpentine-like cross-sectional course with two longitudinal ribbings $S_A$ that are raised towards the exterior side of the bar and alternate with three longitudinal ribbings $S_I$ raised towards the interior side of the bar, leaving half-sized outwardly raised longitudinal ribbings in the edge portions of the cross-section of the rollbar B. A further shell body N (made from the same or a different-material in comparison with the basic shell body) is mounted at the exterior side of the bar on the basic shell body G, so that a plurality of longitudinally extending hollow channels 5 are defined. In a basic shell body G which consists of fibrous composite plastics, a shell body N that consists of metal 8, increases not only the dimensional stability, but also affords an excellent protection against abrasion, in particular in the edge portions, as outlined at 4.

A longitudinally extending stiffening insert R, such as a tubular profile 9, which is connected at 10 to the shell body N and is expediently also connected to the basic shell body G is fitted into at least one of the hollow channels 5. Such a stiffening insert R could be provided in each of the hollow channels 5. When the basic shell body G is designed as a pressed molding, e.g. of fibrous composite plastics, the stiffening insert R can be used during the molding process as a mold core which is conductive to the molding of the longitudinal ribbing thereof.

Figure 9:
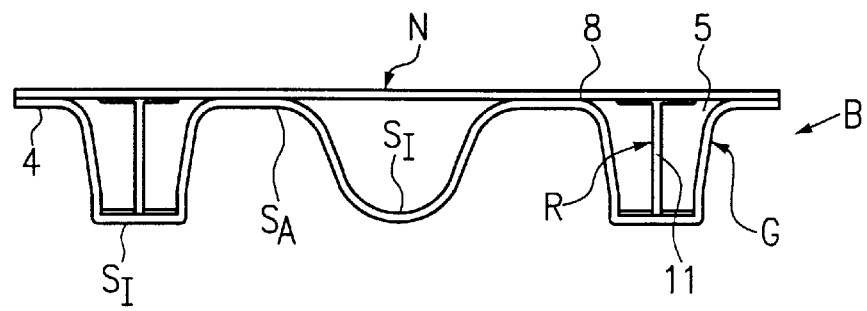

In FIG. 9 the basic shell body G, e.g. of fibrous composite plastics, is combined with the shell body N which consists e.g. of metal 8, or fibrous composite plastics, whereby longitudinally extending hollow channels 5 are formed again. At least one of the hollow channels 5 has fitted thereinto as the stiffening insert R a double-T profile 11 the center web of which is oriented in upward direction whereas its transverse webs at the two ends rest on the bottom of a longitudinal ribbing and on the bottom side of the shell body N, respectively. The stiffening insert R is expediently used as a mold core while the basic shell body G is being press-formed. Connection flanges 4 may be provided in the connection area.

The rollbar which is designed as one or several shells could at least in portions be entirely provided with an elastic coating of foamed material or elastomer or with a cushioning (not shown) so as to conceal e.g. the technical structure of the rollbar and to integrate the rollbar into the car body in an appealing manner as to design and esthetics.

Figure 10:
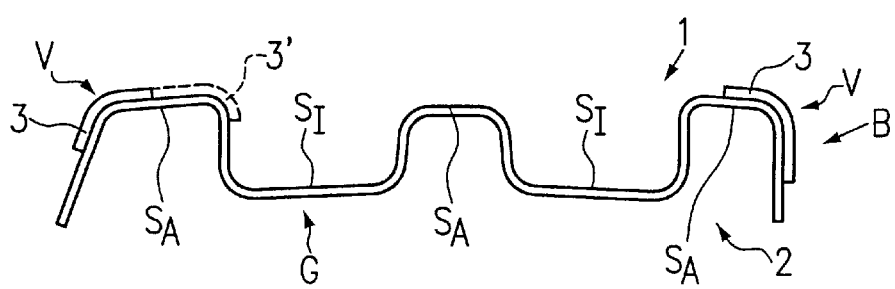

In FIG. 10 the basic shell body G, e.g. according to FIG. 3, is provided with an anti-abrasion means V, e.g. with longitudinally extending profiles 3 of metal or of another abrasion-resistant material such as plastics of mixed forms of said materials, i.e. expediently on surface portions oriented towards the exterior side of the bar and towards the cross-sectional sides, said surface portions coming into frictional contact with the ground or obstacles in case of a roll-over accident or overturn of the vehicle. The profiles 3 can nestle against the edge contours of the basic shell body G and optionally grip over a plurality of edge portions of the longitudinal ribbings, as outlined in broken line at 3', for reasons of an improved connection.

Figure 11:
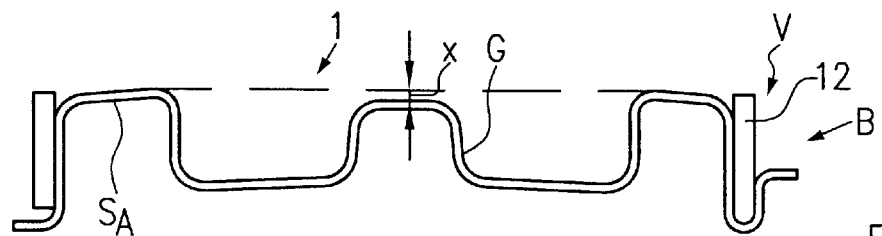

In FIG. 11, a longitudinal profile 12 which is adhered or fastened or even clamped to the basic shell body G is fixed onto the basic body G of the rollbar B, e.g. approximately in accordance with FIG. 3, as a anti-abrasion means V on each cross-sectional outside.

The profiles 3, 3' and 12, respectively, can extend over the entire length of the bar or only in portions in which the rollbar is subjected to frictional contact in case of an overturn. FIG. 11 also illustrates that the two outer longitudinal ribbings $S_A$ which are raised towards the exterior side 1 of the bar and are higher towards the exterior side of the bar by a height dimension x than the central longitudinal ribbing $S_A$ so that in case of an overturn it is only the longitudinal ribbings provided with the anti-abrasion means that get into frictional contact. Furthermore, the different heights of the longitudinal ribbings function as a load-oriented force-receiving means in the rollbar.

Figure 12:
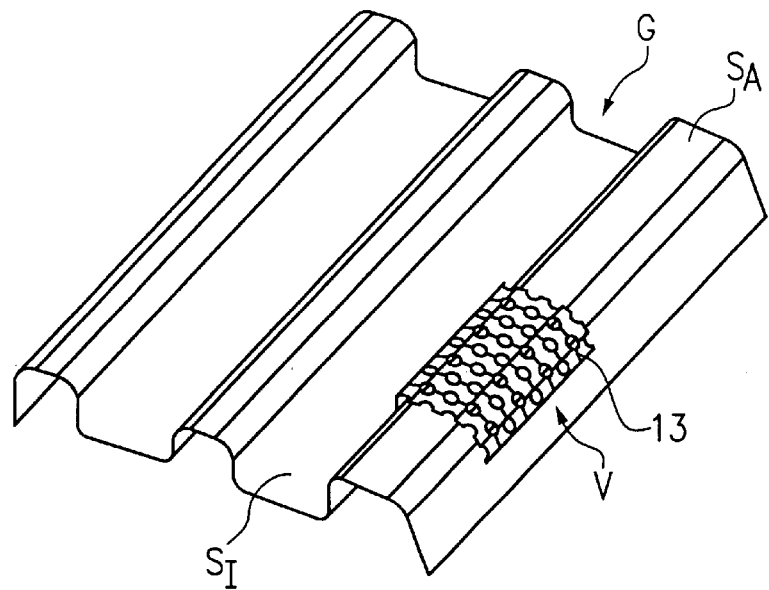
FIGS. 12 and 13 show two further detail variants of such rollbar of the invention with an anti-abrasion means.

In FIG. 12 a perforated sheet or stretched sheet 13 of abrasion-resistant plastics and/or metal is mounted as an anti-abrasion means V on the outwardly raised longitudinal ribbings $S_A$ of the basic shell body G and is adhered thereto either integrally or positively, e.g. without any rivets. Said anti-abrasion means V may optionally even be embedded into the surface.

Figure 13:
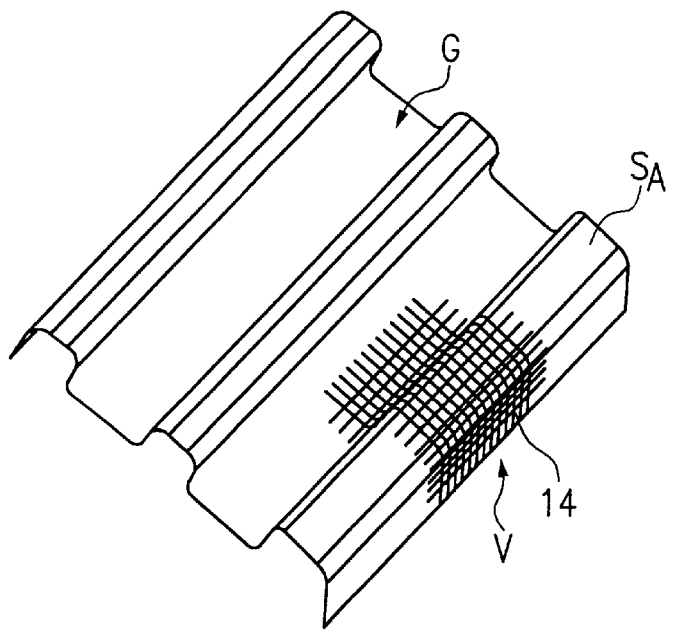

In FIG. 13, the anti-abrasion means V is a wire mesh or netting 14 which is expediently embedded into the surface of the basic shell body G or integrally connected in this manner to the rollbar B. A positive connection is achieved between the plastic matrix of the basic shell body formed as a pressed molding of fibrous composite plastics and the anti-abrasion means, which saves mass and clamping weight.

The basic shell body G and the further basic shell bodies N, optionally also the stiffening inserts R, are expediently pressed moldings of fibrous composite plastics. However, it is also possible that said components are made from metallic two-dimensional materials, such as steel or light-metal sheet, or to choose mixed forms in which different materials are combined. The fibrous composite material of plastics K as is here used consists of fibrous fabric layers embedded into a plastic matrix, the fabric layers containing e.g. glass, carbon or aramide fibers or mixed fabrics, each provided with weft and warp yarns. The plastic matrix could be a thermoplastic or duroplastic material, such as polyamide or PET (polyethylene terephthalate). The components are pressed by thermally molding, preferably pressing, plastic-impregnated fabric layers in the form of prepregs. The fastening connections A (FIG. 2) can be molded from the start. The size of the longitudinal ribbings can gradually increase towards the end sections E, expediently starting from the transitions from the center section M into the end sections.

Modern manufacturing techniques in combination with preceding FEM (finite element method) calculations permit an exact load-oriented shaping of the rollbar and the components thereof, whereby the bar is adapted to the requirements made by the car manufacturers for peak loads such as pressure or bending, without an unusable overdimensioning having to be accepted. The consistent use of the advantages of the monocoque or shell-type construction and of the material used results in a considerable weight reduction, as a result of which simpler fastening means and/or more light-weight, i.e. weaker drive mechanisms for extending or locking the rollbar can be used in the vehicle. Thanks to the small weight of the rollbar an undesired mass concentration in upper vehicle areas is avoided. The longitudinal ribbings are structured and shaped such that the rollbar can optimally cope with the load requirements. To be more specific, the basic shell body only contains the exact material mass required for receiving the loads, i.e. as much weight as possible is saved. The anti-abrasion means can define an energy-absorbing deformation area which mainly receives and absorbs frictional loads, so that the load characteristics of the rollbar for pressure and bending loads do not deteriorate because of abrasion. The longitudinal ribbings are provided with shapes which guarantee a uniform load distribution and an exactly predetermined load absorption with a minimum of material being-used, and can also bear the load transfer to the fastening points inside the vehicle. The warp and/or weft yarns in the fabric layers of the fibrous composite plastics can be oriented towards the main load directions to achieve specific load absorption characteristics.

The basic shell body G is e.g. formed in a preheated press mold from a substantially flat blank under the action of pressure and temperature on the preheated blank which possibly consists of a plurality of layers. The fabric layers are embedded into the plastic matrix by the pressing operation. In the case of a multi-shell construction the individual shells can be glued or welded to one another. The anti-abrasion means can also be adhered by gluing or welding or can be fixed by additional fastening elements. A coating (not shown) of the rollbar conceals not only the technical character, but also offers technical safety advantages and can serve as a weather protection. The anti-abrasion means optionally serves as a deformation zone to be sacrificed when frictional energy is absorbed, e.g., in order to protect the basic shell body as long as possible against abrasion impairing the load absorbing capacity thereof.

Instead of a thermal molding method (pressing), the laying-up method, the RTM (resin transfer compound) method or the SMC (sheet moulding compound) method can be employed for producing the components, e.g., from fibrous composite plastics.

What is claimed is:

1. A rollbar for an open sports car, which extends with a center section and end sections bent from said center section in a main rollbar plane in a direction transverse to the longitudinal direction of said vehicle and approximately over the width of said vehicle, and which comprises fastening connections at the ends, said rollbar having a flat cross-section with a cross-sectional main axis oriented in a direction transverse to the main rollbar axis, comprising a basic shell body which follows the rollbar shape and is of molded two-dimensional material with longitudinal ribbings which extend approximately in straight fashion over said center and end sections of said rollbar and are alternately raised towards the exterior and interior side of said rollbar, with the width, height or both width and height of at least one of said longitudinal ribbings gradually increasing towards the rollbar ends.

2. The rollbar according to claim 1, wherein the width, height or both width and height of at least one of said longitudinal ribbings gradually increases towards the rollbar end in the transitional area from the center section to the end section.

3. The rollbar according to claim 1, wherein a total of three longitudinal ribbings are raised towards the exterior side of said rollbar and middle longitudinal ribbing is less high than the two outer longitudinal ribbings.

4. The rollbar according to claim 1, further comprising at least one outer shell body which defines a closed hollow channel with at least one longitudinal ribbing arranged on the basic shell body on the exterior side, the interior side, or both sides of said rollbar.

5. The rollbar according to claim 4, wherein at least one said closed hollow channel has fitted thereinto a stiffening insert which extends over at least part of said center and end sections of the rollbar and which is either of the same material as or of a material differing from that of said basic shell body.

6. The rollbar according to claim 5, wherein said stiffening insert is an extruded profile of a tubular or I-shaped profile.

7. The rollbar according to claim 5, wherein said stiffening insert is an extruded profile of a tubular or I-shaped profile which is fastened to the outer shell body.

8. The rollbar according to claim 1, further comprising an anti-abrasion means of abrasion-resistant material of metal, plastics or a combination of metal and plastic, which is oriented towards the exterior side of said rollbar.

9. The rollbar according to claim 8, wherein said anti-abrasion means has a longitudinally extending profile.

10. The rollbar according to claim 8, wherein said anti-abrasion means is selected from at least one of a braiding, a perforated sheet, a stretched sheet, a fiber reinforcement or metal, a wire reinforcement of metal, a fiber reinforcement of plastics, a wire reinforcement of plastics, a fiber reinforcement of metal and plastics, and a wire reinforcement of metal and plastics, and is integrally connected to said rollbar.

11. The rollbar according to claim 8, wherein said anti-abrasion means is integrally connected to the basic shell body or embedded into the surface thereof.

12. The rollbar according to claim 1, wherein said basic shell body is a shell integrally formed from a pressed molding of fibrous composite plastics.

13. The rollbar according to claim 12, wherein said basic shell body comprises fiber textile layers embedded in said fibrous composite plastics in a plastic matrix.

14. The rollbar according to claim 13, wherein the textile of said fibrous composite plastics is selected from at least one of glass, carbon, aramide fibers and mixed fibers.

15. The rollbar according to claim 14, wherein said textile is selected from at least one of a fabric, laid structure, knitting, braiding and a combination thereof.

16. The rollbar according to claim 13, wherein said plastic matrix is a thermoplastic or duroplastic material.

17. The rollbar according to claim 16, wherein said plastic matrix is selected from at least one of polyamide, PP (polypropylene) a PET (polyethylene terephthalate).

18. The rollbar according to claim 11, wherein said basic shell body is thermally molded by pressing plastic impregnated fabric layers of prepregs.

19. A rollbar for an open sports car, which extends with a center section and end sections bent from said center section in a main rollbar plane in a direction transverse to the longitudinal direction of said vehicle and approximately over the width of said vehicle, and which has fastening connections at the ends, said rollbar having a flat cross-section with a cross-sectional main axis oriented in a direction transverse to the main rollbar axis, comprising a basic shell body which follows the rollbar shape and is of molded two-dimensional material with longitudinal ribbings which extend approximately in straight fashion over said center and end sections of said rollbar and are alternately raised towards the exterior and interior side of said rollbar, a total of three longitudinal ribbings are raised towards the exterior side of said rollbar and the middle longitudinal ribbing is lower than the outer longitudinal ribbings.

20. The rollbar according to claim 19, further comprising at least one outer shell body which defines a closed hollow channel with at least one longitudinal ribbing arranged on the basic shell body on the exterior side, the interior side, or both sides of said rollbar.

21. The rollbar according to claim 20, wherein the at least one said closed hollow channel has fitted thereinto a stiffening insert which extends over at least part of said center and end sections of the rollbar and which is either of the same material as or of a material differing from that of said basic shell body.

22. The rollbar according to claim 21, wherein said stiffening insert is an extruded profile of a tubular or I-shaped profile.

23. The rollbar according to claim 22, wherein said stiffening insert is an extruded profile of a tubular or I-shaped profile which is fastened to the outer shell body.

24. A rollbar for an open sports car, which extends with a center section and end sections bent from said center section in a main rollbar plane in a direction transverse to the longitudinal direction of said vehicle and approximately over the width of said vehicle, and which has fastening connections at the ends, said rollbar having a flat cross-section with a cross-sectional main axis oriented in a direction transverse to the main rollbar axis, comprising a basic shell body which follows the rollbar shape and is of molded two-dimensional material with longitudinal ribbings which extend approximately in straight fashion over said center and end sections of said rollbar and are alternately raised towards the exterior and interior side of said rollbar, and an anti-abrasion means of abrasion-resistant material selected from one of metal, plastics and a combination of metal and plastic, which is integrally connected to the exterior side of said rollbar.

25. The rollbar according to claim 24, wherein said anti-abrasion means extend along said longitudinally extending ribbings.

26. The rollbar according to claim 24, wherein said anti-abrasion means is selected from at least one of a braiding, a perforated sheet, a stretched sheet, a fiber reinforcement of metal, a wire reinforcement of metal, a fiber reinforcement of plastics, a wire reinforcement of plastics, a fiber reinforcement of metal and plastics, or a wire reinforcement of metal and plastics, and is integrally connected to said rollbar.

27. The rollbar according to claim 26, wherein said anti-abrasion means is integrally connected to the basic shell body or embedded into the surface of.

28. A rollbar for an open sports car, which extends with a center section and end sections bent from said center section in a main rollbar plane in a direction transverse to the longitudinal direction of said vehicle and approximately over the width of said vehicle, and which has fastening connections at the ends, said rollbar having a flat cross-section with a cross-sectional main axis oriented in a direction transverse to the main rollbar axis, comprising a basic shell body which follows the rollbar shape and is of molded two-dimensional material with longitudinal ribbings which extend approximately in straight fashion over said center and end sections of said rollbar and are alternately raised towards the exterior and interior side of said rollbar, said basic shell body being a shell integrally formed from a pressed molding of fibrous composite plastics with fiber textile layers embedded in said fibrous composite plastics in a plastic matrix with the textile of said fibrous composite plastics selected from at least one of glass, carbon, aramide fibers and mixed fibers.

29. The rollbar according to claim 28, wherein said fiber textile is selected from at least one of a fabric, laid structure, knitting, braiding and a combination thereof, and said plastic matrix is a thermoplastic or duroplastic material.

30. The rollbar according to claim 28, wherein said plastic matrix is selected from at least one of polyamide, PP (polypropylene) and PET (polyethylene terephthalate).

31. The rollbar according to claim 28, wherein said basic shell body is thermally molded by pressing plastic impregnated fabric layers of prepregs.

* * * * *